(12) United States Patent
Parness et al.

(10) Patent No.: US 8,789,629 B2
(45) Date of Patent: Jul. 29, 2014

(54) TERRAIN TRAVERSING DEVICE HAVING A WHEEL WITH MICROHOOKS

(75) Inventors: Aaron Parness, Los Angeles, CA (US); Clifford F. McKenzie, Eagle Springs, NC (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/606,885

(22) Filed: Sep. 7, 2012

(65) Prior Publication Data
US 2013/0062134 A1 Mar. 14, 2013

Related U.S. Application Data

(60) Provisional application No. 61/533,042, filed on Sep. 9, 2011.

(51) Int. Cl.
*B62D 61/00* (2006.01)
*B60B 15/02* (2006.01)
*B60B 9/12* (2006.01)

(52) U.S. Cl.
CPC .............. *B60B 15/025* (2013.01); *B62D 61/00* (2013.01); *B60B 9/12* (2013.01); *B60B 2900/721* (2013.01); *B60Y 2200/46* (2013.01); *B60Y 2200/47* (2013.01); *B60Y 2200/48* (2013.01)
USPC .......................................... 180/7.1; 180/218

(58) Field of Classification Search
USPC .................................. 180/7.1, 218
See application file for complete search history.

(56) References Cited

U.S. PATENT DOCUMENTS

| | | | | |
|---|---|---|---|---|
| 6,006,607 A * | 12/1999 | Bryzek et al. | | 73/727 |
| 6,502,657 B2 * | 1/2003 | Kerrebrock et al. | | 180/218 |
| 6,548,982 B1 * | 4/2003 | Papanikolopoulos et al. | | 318/568.11 |
| 7,559,385 B1 * | 7/2009 | Burt et al. | | 180/65.1 |
| 8,186,469 B2 * | 5/2012 | Yim et al. | | 180/218 |
| 8,496,077 B2 * | 7/2013 | Nesnas et al. | | 180/7.5 |
| 8,505,667 B2 * | 8/2013 | Kim et al. | | 180/218 |
| 2002/0036104 A1 * | 3/2002 | Kerrebrock et al. | | 180/6.2 |
| 2003/0137268 A1 * | 7/2003 | Papanikolopoulos et al. | | 318/568.11 |
| 2004/0000439 A1 * | 1/2004 | Burt et al. | | 180/7.1 |
| 2010/0152922 A1 * | 6/2010 | Carlson et al. | | 701/2 |
| 2011/0073386 A1 * | 3/2011 | Provancher | | 180/7.1 |
| 2013/0068527 A1 * | 3/2013 | Parness et al. | | 175/57 |

OTHER PUBLICATIONS

Asbeck, A., et al., Climbing walls with microspines, Proceedings of the 2006 IEEE Int'l. Conf. on Robotics & Automation, Orlando, FL, May 2006, pp. 4315-4317.
Barnes, M., et al., ThrowBot: Design considerations for a man-portable throwable robot, Proccedings of the SPIE Unmanned Ground Vehicle Tech. VII, Orlando, FL, Mar. 2006, pp. 1-10.

(Continued)

*Primary Examiner* — Kevin Hurley
(74) *Attorney, Agent, or Firm* — Steinfl & Bruno, LLP (57) ABSTRACT

A terrain traversing device includes an annular rotor element with a plurality of co-planar microspine hooks arranged on the periphery of the annular rotor element. Each microspine hook has an independently flexible suspension configuration that permits the microspine hook to initially engage an irregularity in a terrain surface at a preset initial engagement angle and subsequently engage the irregularity with a continuously varying engagement angle when the annular rotor element is rotated for urging the terrain traversing device to traverse a terrain surface.

17 Claims, 7 Drawing Sheets

(56) References Cited

OTHER PUBLICATIONS

Birkmeyer, P., et al., Dash: A dynamic 16g hexpedal robot, 2009 IEEE/RSJ Int'l. Conf. on Intelligent Robots and Systems, St. Louis, MO, Oct. 11-15, 2009, pp. 2683-2689.

iRobot: Robots for Defense and Security retrieved from http://www.irobot.com/en/us/robots/defense.aspx on May 7, 2013.

Murphy, M., et al., Waalbot: An agile small-scale wall climbing robot utilizing pressure sensitive adhesives, Proceedings of the 2006 IEEE/RSJ Int'l. Conf. on Intelligent Robots and Systems, Being, China, Oct. 9-16, 2006, pp. 3411-3416.

Parness, A., et al., Climbing rough vertical surfaces with hierarchical directional adhesion, 2009 IEEE Int'l. Conf. on Robotics and Automation—Kobe Int'l. Conf. Center, Kobe, Japan, May 12-17, 2009, pp. 2675-2680.

Silva, M., et al., A survey of technologies for climbing robots adhesion to surfaces, IEEE Int'l Conf. on Computational Cybernetics (ICCC), Stara Lesna, Slovakia, Nov. 27-29, 2008, pp. 127-132.

Spenko, MJ, et al., Biologically inspired climbing with a hexapedal robot, Univ. of Pennsylvania Scholarly Commons, Department of Electrical & Systems Engineering, Apr. 1, 2008, pp. 1-31.

Xiao, J., et al., Design of mobile robots with wall climbing capability, Proceedings of the 2005 IEEE/ASME Int'l. Conf. on Advanced Intelligent Mechatronics, Monterey, CA, Jul. 24-28, 2005, pp. 438-443.

\* cited by examiner

TERRAIN TRAVERSING DEVICE HAVING A WHEEL WITH MICROHOOKS

CROSS REFERENCE TO RELATED APPLICATIONS

This application claims priority under 35 U.S.C. §119(e) from U.S. Provisional Patent Application No. 61/533,042 entitled "DROP: The Durable Reconnaissance and Observation Platform" filed on Sep. 9, 2011, which is incorporated herein by reference in its entirety.

STATEMENT OF GOVERNMENT GRANT

The invention described herein was made in the performance of work under a NASA contract, and is subject to the provisions of Public Law 96-517 (35 USC 202) in which the Contractor has elected to retain title.

FIELD

The present teachings relate to terrain traversing devices such as robots that may be used for reconnaissance purposes. More specifically, the present disclosure relates to terrain traversing device having a wheel with microhooks that can travel across a horizontal surface such as a floor of a room and then carry out vertical traversal operations such as climbing up a wall, climbing up the steps of a staircase, or climbing over an obstacle such as a curb.

BACKGROUND

Unexpected obstacles are often encountered when a remotely operated device is used for traversing a hostile and unfamiliar environment, thereby requiring the remotely operated device to have capabilities and features that address and conquer at least some of these unexpected obstacles.

SUMMARY

According to a first aspect of the present disclosure, a terrain traversing device includes a first microspine wheel assembly. The first microspine wheel assembly has a circular planar rotor with a plurality of microspine hooks arranged along a circumferential edge of the circular planar rotor. Each individual microspine hook is mounted on an independently flexible suspension that accommodates a variable engagement angle between the individual microspine hook and an irregularity on a terrain surface when the circular planar rotor is rotated in one of a clockwise or a counter-clockwise direction to urge the terrain traversing device to traverse the terrain.

According to a second aspect of the present disclosure, a terrain traversing device includes a first microspine wheel assembly comprising a circular planar rotor with a plurality of microspine hook assemblies arranged on a circumferential edge of the circular planar rotor. The plurality of microspine hook assemblies includes a first microspine hook assembly having a first independently flexible suspension configuration supporting a first microspine hook. The first independently flexible suspension is configured to permit the first microspine hook to initially engage an irregularity in a terrain surface with a parallel orientation between the terrain surface and the first microspine hook assembly and subsequently engage the irregularity with a continuously varying engagement angle between the first microspine hook and the terrain surface when the circular planar rotor is rotated in one of a clockwise or a counter-clockwise direction to urge the terrain traversing device to traverse a terrain surface.

According to a third aspect of the present disclosure, a terrain traversing device includes a first annular rotor element with a plurality of co-planar microspine hooks arranged on a periphery of the annular rotor element. Each microspine hook has an independently flexible suspension configuration that permits the microspine hook to initially engage an irregularity in a terrain surface at a preset initial engagement angle and subsequently engage the irregularity with a continuously varying engagement angle when the annular rotor element is rotated for urging the terrain traversing device to traverse a terrain surface.

According to a fourth aspect of the present disclosure, a terrain traversing device includes a cylindrical housing and a pair of motors. A first motor is housed in the cylindrical housing and coupled to a proximal end of a first axle. A first annular rotor element is coupled to a distal end of the first axle, the first annular rotor element having a first set of co-planar microspine hooks arranged on the periphery of the first annular rotor element. Each microspine hook is arranged to engage upon contact with irregularities in a terrain surface when the first axle is rotated for urging the terrain traversing device to traverse the terrain surface. A second motor is also housed in the cylindrical housing and coupled to a proximal end of a second axle. A second annular rotor element is coupled to a distal end of the second axle, the second annular rotor element having a second set of co-planar microspine hooks arranged on the periphery of the second annular rotor element. Each microspine hook is arranged to engage upon contact with irregularities in the terrain surface when the second axle is rotated for urging the terrain traversing device to traverse a terrain surface.

According to a fifth aspect of the present disclosure, a rotary microspine device includes a circular planar rotor with a plurality of microspine hooks arranged on a circumferential edge of the circular planar rotor. Each individual microspine hook is mounted on an independently flexible suspension that accommodates a variable engagement angle between each individual microspine hook and an irregularity on a traversal surface when the circular planar rotor is rotated.

Further aspects of the disclosure are shown in the specification, drawings and claims of the present application.

BRIEF DESCRIPTION OF THE DRAWINGS

The accompanying drawings, which are incorporated into and constitute a part of this specification, illustrate one or more embodiments of the present disclosure and, together with the description of a few example embodiments, serve to explain the principles and implementations of the disclosure. The components in the drawings are not necessarily drawn to scale. Instead, emphasis is placed upon clearly illustrating various principles. Moreover, in the drawings, like reference numerals designate corresponding parts throughout the several views.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that terminology such as, for example, "microspine wheel assembly," "rotor," "annular," and "irregularity" are used herein as a matter of convenience for description purposes and should not be interpreted literally in a narrowing sense.

For example, the term "rotor" may be broadly understood as representing a circular support element, a circular housing, a cylindrical mount, or an annular element. A person of ordinary skill in the art will understand that these terms may be used interchangeably and as such must be interpreted accordingly. It will be also be understood that the drawings use certain symbols and graphics that must be interpreted broadly as can be normally understood by persons of ordinary skill in the art. As one example, of such interpretation, the microspines are shown in various figures as pointing in a clockwise direction. However, one of ordinary skill in the art will understand that in certain alternative embodiments, microspines may be oriented to point in a counter-clockwise direction. Furthermore, while the description below is directed at two-wheeled robots of a relatively small size, various aspects of the invention may be implemented in various other sizes and ways, including for example, a one-wheeled device, a three-wheeled device, or a four-wheeled vehicle, wherein such devices may further include a chassis associated with the wheels and a compartment mounted on the chassis.

Figure 1:
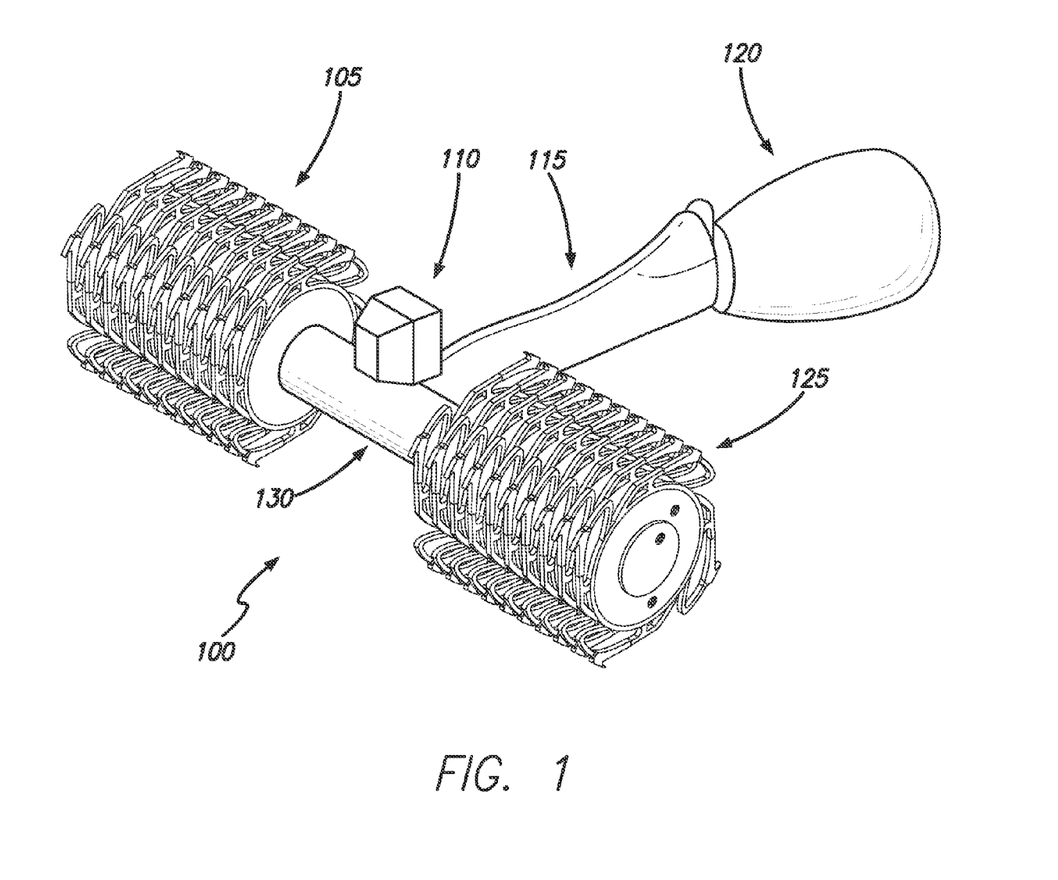
FIG. 1 shows a perspective view of a terrain traversing device according to an example embodiment of the present disclosure.

Attention is now drawn to FIG. 1, which shows a perspective view of a terrain traversing device 100 according to one of several example embodiments of the present disclosure. Terrain traversing device 100 includes a first wheel assembly 105 that is composed of several individual microspine wheel assemblies stacked together in an array arrangement that is described below in more detail. Terrain traversing device 100 further includes a second wheel assembly 125 that is also formed by assembling several other individual microspine wheel assemblies in a cooperative arrangement so as to permit propulsion of terrain traversing device 100 as a two-wheeled device over various surfaces.

Tail assembly 115, which includes a bulb 120 at one end, is coupled to a cylindrical housing 130. Tail assembly 115 helps stabilize terrain traversing device 100 during terrain traversal, especially when terrain traversing device 100 transitions from a horizontal surface to a vertical surface. Bulb 120 may be designed for various purposes, such as for example, as a cushioning element to help protect terrain traversing device 100 when terrain traversing device 100 falls to the ground from a high location such as a roof of a building. In alternative embodiments, bulb 120 may be replaced by a pair of tines (not shown), or other suitable termination, directed at providing stability in various planes, providing maneuverability during travel, or for protecting against damage during various types of impacts.

In this example embodiment, terrain traversing device 100 has a camera unit 110 mounted on cylindrical housing 130. In other embodiments, camera unit 110 may be supplemented or complemented with other sub-assemblies such as a microphone or a detector device (for example, to detect chemicals, heat, movement etc.). Furthermore, in this example embodiment, cylindrical housing 130 houses a pair of motors (not shown) that individually drive each of first and second wheel assemblies 105 and 125 via two separate axles (not shown).

Terrain traversing device 100 also includes various other elements (not shown) such as a controller unit, communications unit, battery pack, and sensor assemblies for sensing motion-related parameters such as rpm, torque, slippage, acceleration etc., of wheel assemblies 105 and 125. These various elements may be suitably housed in one or more of cylindrical housing 130, tail assembly 115 and/or bulb 120 and used not only to propel terrain traversing device 100 forward or backwards, but to provide communication interactions with a remote communications unit (not shown). The remote communications unit may be human-operated or may be incorporated into a computer in accordance with various embodiments.

Figure 2:
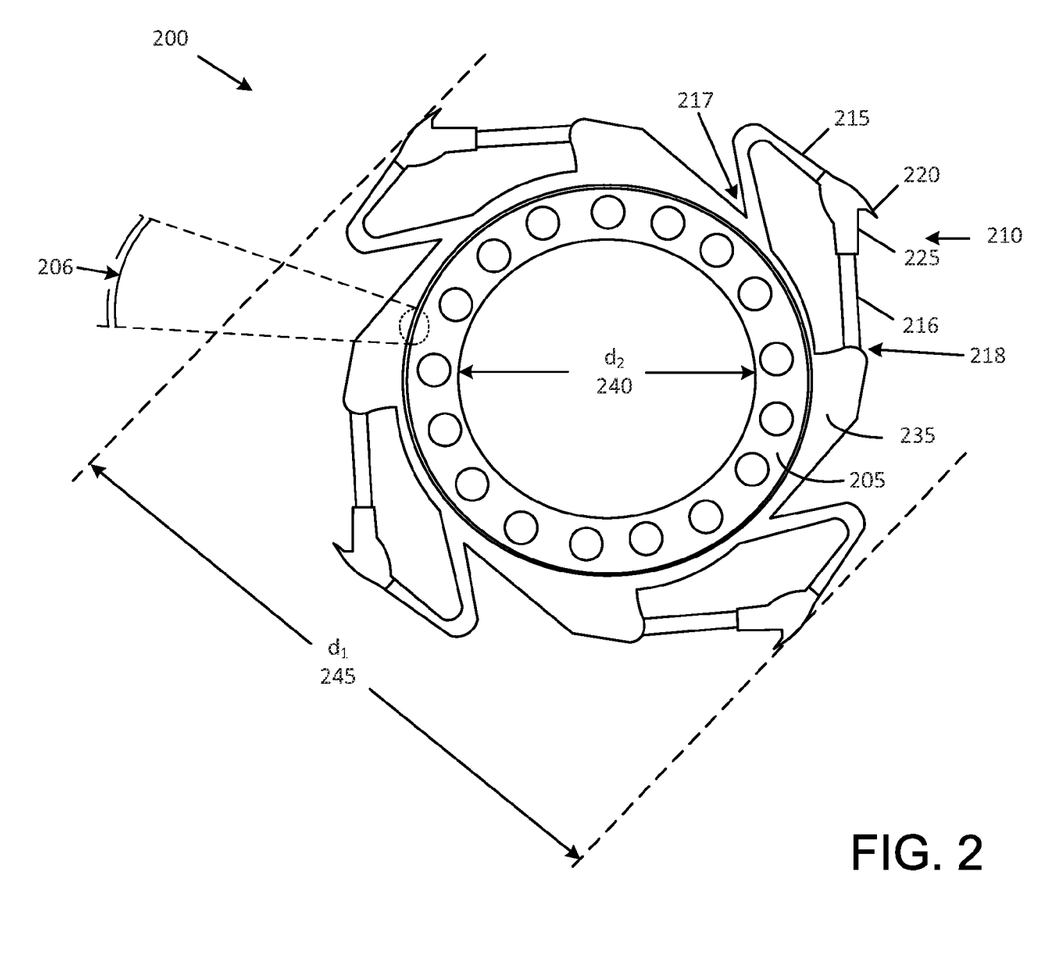
FIG. 2 is a line drawing that shows certain features of a microspine wheel assembly that is a part of the terrain traversing device shown in FIG. 1.

Attention is now drawn to FIG. 2, which shows a microspine wheel assembly 200 that is a part of terrain traversing device 100. As indicated above, each of wheel assemblies 105 and 125 of terrain traversing device 100 are formed by stacking a plurality of such microspine wheel assemblies in an array arrangement on an axle. Using a rotary movement to grasp a surface (carried out via wheel assemblies 105 and 125 containing microspine wheel assemblies) provides several advantages over prior art techniques such as those incorporating a linear sliding motion used by robotic legs for obtaining a grip upon a surface. The linear sliding motion required by robotic legs make them unsuitable for quick transitions from a horizontal to a vertical surface and is also unsuitable for curb mounting or stair climbing.

Microspine wheel assembly 200 may be generally described as a substantially circular planar element with a plurality of microspine hooks (each substantially similar to microspine hook 220) mounted on a peripheral edge 206 of the circular element. Peripheral edge 206 may be alternatively referred to herein as a circumferential edge of rotor 205. The microspine hooks provide a grabbing/grasping action by engaging with irregularities on a traversal surface so as to propel terrain traversing device 100 over the traversal surface. Though the example embodiment of FIG. 2 shows four microspine hooks, it will be understood that in other embodiments, the number of microspine hooks may range from a single one to quantities other than four.

Furthermore, it will be understood that the term "irregularities" is used herein to generally indicate any feature of a surface, such as for example, a protrusion or an indentation, that is suitable for one or more microspine hooks to obtain purchase as a part of the grabbing action. It will be also understood that the term "engage" is generally used herein in the context of the grabbing action, and one of ordinary skill in the art will recognize that alternative terms such as "purchase," may be used instead without deviating from the spirit of the invention. It will be further understood that the phrase "substantially circular planar element" that is used above may be alternatively referred to herein by various other terms such as for example, "rotor," "circular planar rotor," "circular housing," "cylindrical mount," or an "annular rotor element." However, for convenience of description vis-à-vis identification with reference to FIG. 2, this element will be generally referred to below as "rotor 205."

Microspine wheel assembly 200 is selected to have any suitable thickness based on various factors, such as mechanical strength, rigidity, machinability etc. While there is no particular limitation on the upper end of a thickness range, the lower end of the thickness range is only constrained to a cross-sectional dimension (e.g., diameter, width, etc.) of one or more of microspines 220. The range of thickness permits microspine wheel assembly 200 to be used in a wide variety of applications over a wide variety of surfaces and environments.

The diameter $d_1$ 245 of microspine wheel assembly 200 is selected to have any suitable value based on a few parameters, such as, for example, the weight, height and/or a desired rate of travel of terrain traversing device 200. However, in contrast to certain prior art devices, diameter $d_1$ 245 of microspine wheel assembly 200 is not constrained by the height of certain objects to be traversed, such as for example, the height of a step or a curb. This aspect is described below in more detail using FIG. 6. Specifically, given the lack of prior knowledge of the type of terrain to be traversed, it is generally desirable that diameter $d_1$ 245 of microspine wheel assembly 200 not be constrained by the height of various obstacles. However, it will be understood that in certain applications, it may be desirable to use a small diameter so as to accommodate traversal of certain obstacles such as narrow passageways.

Attention is now drawn to microspine hook 220 that is mounted on a flexible suspension 210, which is one of four suspensions shown as parts of mount 235. Mount 235 may be formed in several alternative ways using several alternative materials. For example, in one embodiment, mount 235 is a unitary mount formed as a rigid structure using a material such as a metal or a hard plastic. In another embodiment, mount 235 is formed as a unitary flexible or semi-flexible structure using a rubber-based compound, for example. Furthermore, in a first implementation, mount 235 and rotor 205 are fabricated as two separate parts and subsequently mount 235 is attached to rotor 205 in an arrangement whereby mount 235 rotates along with rotor 205 when rotor 205 is rotated. The attachment may be carried out using suitable attachment mechanisms such as screws, dowels, washers, seals etc., or via a force-fit process. In a second implementation, mount 235 and rotor 205 are fabricated together as a single unitary assembly.

Flexible suspension 210 includes a hook assembly 225 that anchors a microspine hook 220, and further includes two flexible elements that support hook assembly 225 in a manner that provides a flexing action when microspine hook 220 engages with an irregularity in a traversal surface. More particularly, flexible loop element 215 couples one end of hook assembly 225 to a first attachment location 217 along the circumferential edge of rotor 205, while stretchable element 216 couples an opposing end of hook assembly 225 to a second attachment location 218 located on mount 235.

Microspine hook 220 is composed of a suitable material that permits microspine hook 220 to be repeatedly engaged and disengaged from hard surfaces without significant damage or wear and tear. One example of a suitable material is a metal such as stainless steel.

Rotor 205 may be implemented in various ways using various materials. Typically, rotor 205 is composed of a hard material (a metal or a hard plastic, for example) and includes a central opening having a diameter $d_2$ 240 that is selected in order to accommodate an axle (not shown) that is inserted through the central opening. This arrangement may be better understood from FIG. 1, wherein each of wheel assemblies 105 and 125 include multiple microspine wheel assemblies arranged in parallel with each other with individual axles (not shown) inserted therethrough.

The multiple holes shown along the annular body of rotor 205 may be used in several ways. In one case, these holes assist in arranging multiple microspine wheel assemblies on an axle in a manner that provides for an intentional misalignment between the microspine hooks of adjacent microspine wheel assemblies. The intentional misalignment permits each of the plurality of microspine hooks of a first microspine wheel assembly to engage to irregularities in the terrain surface at different engagement instances when compared to engagement instances of the plurality of microspine hooks of a second microspine wheel assembly (which may or may not be immediately adjacent to the first microspine wheel assembly).

Figure 3:
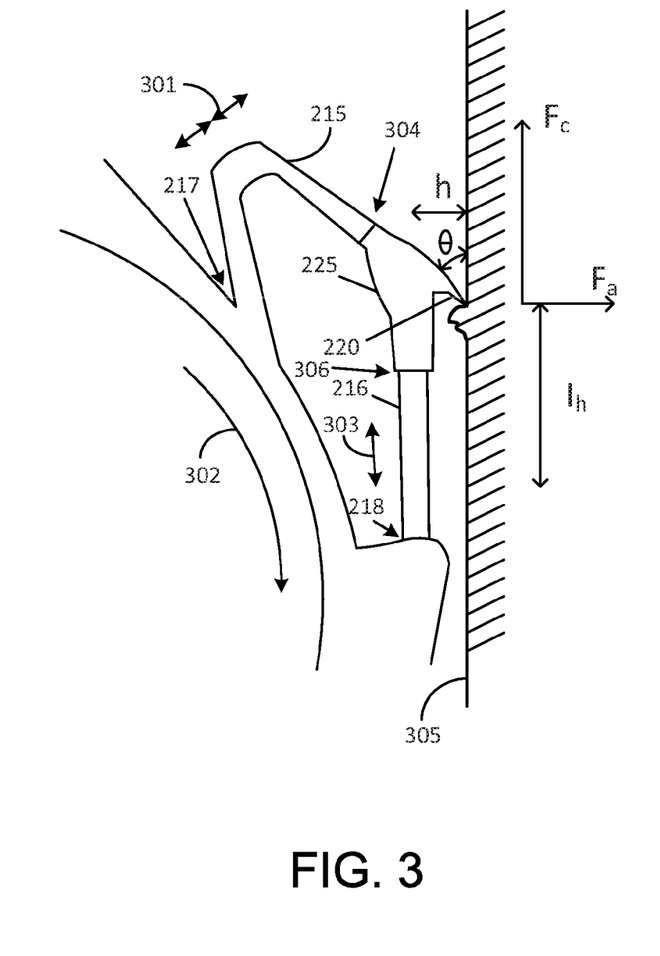
FIG. 3 shows a microspine hook, which is a part of the microspine wheel assembly shown in FIG. 2, engaged to an irregularity in a vertical surface.

Attention is now drawn to FIG. 3, which shows microspine hook 220 engaged to an irregularity in a vertical surface 305. The probability of microspine hook 220 engaging to various irregularities in vertical surface 305 is dependent on various factors, such as the size of microspine hook 220, shape and stiffness of flexure 215, engagement angle "θ," and smoothness/roughness of vertical surface 305.

Flexible loop element 215 flexes bi-directionally as shown by the pair of bi-directional arrows 301 that is indicative of a compression/expansion action on the part of flexible loop element 215 as microspine wheel assembly 200 rotates in the process of traversing up vertical surface 305. The compression/expansion action allows the separation distance between attachment location 217 and location 304 to vary, while simultaneously providing other benefits, such as preventing tangling between adjacent microspine wheel assemblies and providing alignment as microspine wheel assembly rotates.

Stretchable attachment 216 accommodates stretching as shown by the bi-directional arrow 303, thereby allowing the separation distance between attachment location 218 and location 306 to vary as microspine wheel assembly rotates. In addition to providing a stretching action, stretchable attachment 216 also operates as a load bearing member by bearing at least a part of the weight of microspine wheel assembly 200 during certain phases of the rotation of microspine wheel assembly 200 when microspine hook 220 is engaged to the irregularity on vertical surface 305.

The first flexing action provided by flexible loop element 215 cooperates with the second flexing action provided by stretchable attachment 216 and permits microspine hook 220 to remain engaged with the irregularity through a larger engagement angle "θ" than would be feasible with a rigidly mounted microspine hook. While the embodiment shown in FIG. 2 shows flexure 215 as a c-shaped joint, in other embodiments, the flexing action can be provided using various other mechanisms using elements such as springs, elastomers, and cantilevers.

However, it is desirable to limit the range of engagement angle θ so as to increase the probability of microspine hook 220 engaging to various types of irregularities in various types of climbing surfaces. More particularly, an engagement angle θ ranging from about 30 degrees to about 45 degrees is preferable in order to maximize a ratio of climbing force ($F_c$) to adhesion force ($F_a$).

The desirable angular displacement θ range (from about 30 degrees to about 45 degrees) is based on two contributory angles, which are based, at least in part, on selecting suitable values for "$l_h$" and "h." Specifically, microspine hook 220 initially engages to the irregularity at a first contributory angle of about 30 degrees that occurs when hook assembly 225 is oriented substantially parallel to vertical surface 305. This engagement action by microspine hook 220 is followed by a flexing action (indicated by the pair of arrows 301) of flexible suspension 210 (as a result of rotation of microspine wheel assembly 200 indicated by arrow 302), which results in angular displacement θ increasing by a second contributory angle. The second contributory angle is intentionally constrained to about 15 degrees, so that the sum of the two contributory angles provides an angular displacement θ in the range from about 30 degrees to about 45 degrees.

It will be also pertinent to point out that the engagement characteristic of each individual microspine hook in microspine wheel assembly 200 is independent of other microspine hooks in microspine wheel assembly 200. Furthermore, each individual microspine hook when engaged to the irregularity in vertical surface 305 can retain grip even when terrain traversing device 100 is deprived of a power source.

In contrast to the desired engagement characteristics described above, disengagement of microspine hook 220 from the irregularity on vertical surface 305 automatically occurs as a result of a decrease in engagement angle θ towards zero when microspine wheel assembly 200 rotates in order to climb up vertical surface 305.

Figure 4:
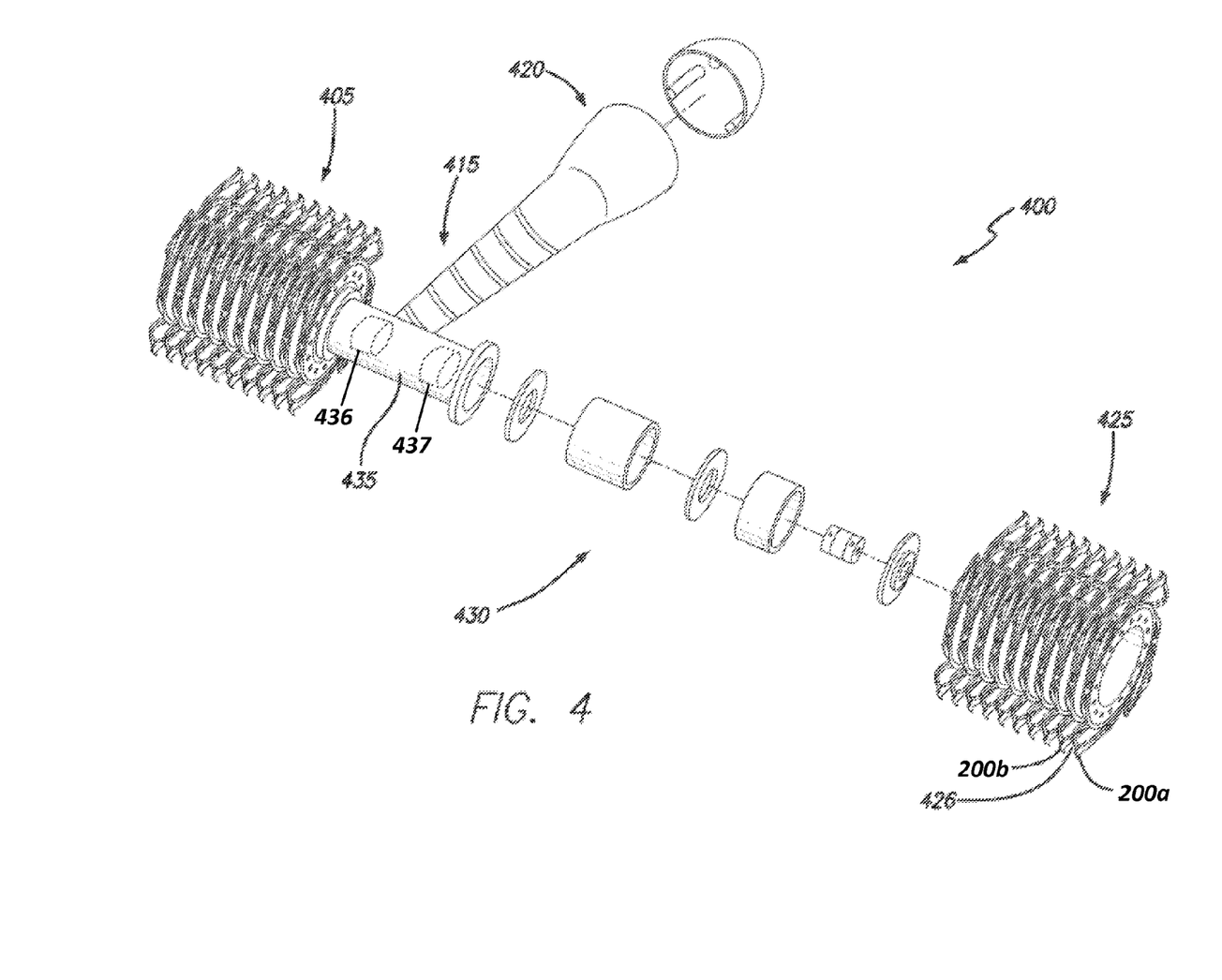
FIG. 4 shows an exploded view of a terrain traversing device that illustrates a few component parts according to an example embodiment of the present disclosure.

FIG. 4 shows an exploded view that reveals a few component parts of a terrain traversing device 400 in accordance with the present disclosure. It will be understood that some of the components referred to below are not shown in the drawing because people of ordinary skill in the art will readily understand the nature and characteristics of these components.

Axle 430 is coupled to a central housing 435 in which is housed one or more motors for driving wheel assemblies 405 and 425. In one embodiment, a first brush motor 436 and a second brush motor 437 are housed in central housing 435, with each motor individually driving a respective wheel assembly 405 and 425. Tail assembly 415, which terminates in a weighted bulb 420, may house one or more batteries that are used to provide power to the one or more motors in central housing 435, and may also house additional items such as a radio-frequency (RF) transceiver and a controller unit incorporating a microprocessor or microcontroller. In one embodiment, tail assembly 415 is composed of alternating sections of rigid and elastic materials (indicated by the alternating dark and light bands) that are loosely modeled to vertebrae in a spine. Such an arrangement allows terrain traversing device 400 to bend and twist, thus providing certain advantages during motion, as well as during impact when falling from a height. Various other elements such as cushions, pads, springs, extension arms, and cladding may be incorporated into various parts (e.g., axle, tails section, etc.) of the terrain traversing device 400 in order to protect the device during impact from falls at various heights.

Axle 430 has a modular design and is fabricated using a suitable material having desirable properties such as light weight, durability, and impact absorption. In one implementation, axle 430 is formed of selective laser sintered (SLS) high-elongation polyamide-based materials.

Each of wheel assemblies 405 and 425 is composed of an array of microspine wheel assemblies. More particularly, wheel assembly 425 includes a first microspine wheel assembly 200*a* that is mounted adjacent to a second microspine wheel assembly 200*b* with a divider disk 426 interposed therebetween. The major surfaces of rotors 205 of each of the first and second microspine wheel assemblies 200*a* and 200*b*, with divider disk 426 interposed therebetween, are arranged substantially parallel to each other.

Divider disk 426 that is interposed between adjacent pairs of microspine wheel assemblies is operative to provide a separation distance between the microspine hooks of the adjacent microspine wheel assemblies thereby limiting the motion of each microspine hook to a rotary plane and preventing entanglement between the microspine hooks. Divider disk 426 also provides a more even contact surface for the wheel assembly with a horizontal surface when terrain traversing device 400 is traversing the horizontal surface. This is achieved in part by suitably dimensioning divider disk 426 with respect to the microspine wheel assemblies, so as to provide a recessed circumferential slot between two adjacent microspine wheel assemblies. The slot may also accommodate a horizontal flexing action of the microspine hooks without entanglement with other microspine hooks, when terrain traversing device 400 is traversing the horizontal surface. In one embodiment, divider disk 426 is selected to have a thickness of about 0.15 mm.

Divider disk 426 may be alternatively referred to herein as a spacer disk. In one embodiment, the spacer disk is implemented as a separate component independent of the microspine wheel assemblies. In another embodiment, the separation between adjacent microspine wheel assemblies may be provided by providing suitable protrusions on the body of one or both of the microspine wheel assemblies.

Figure 5:
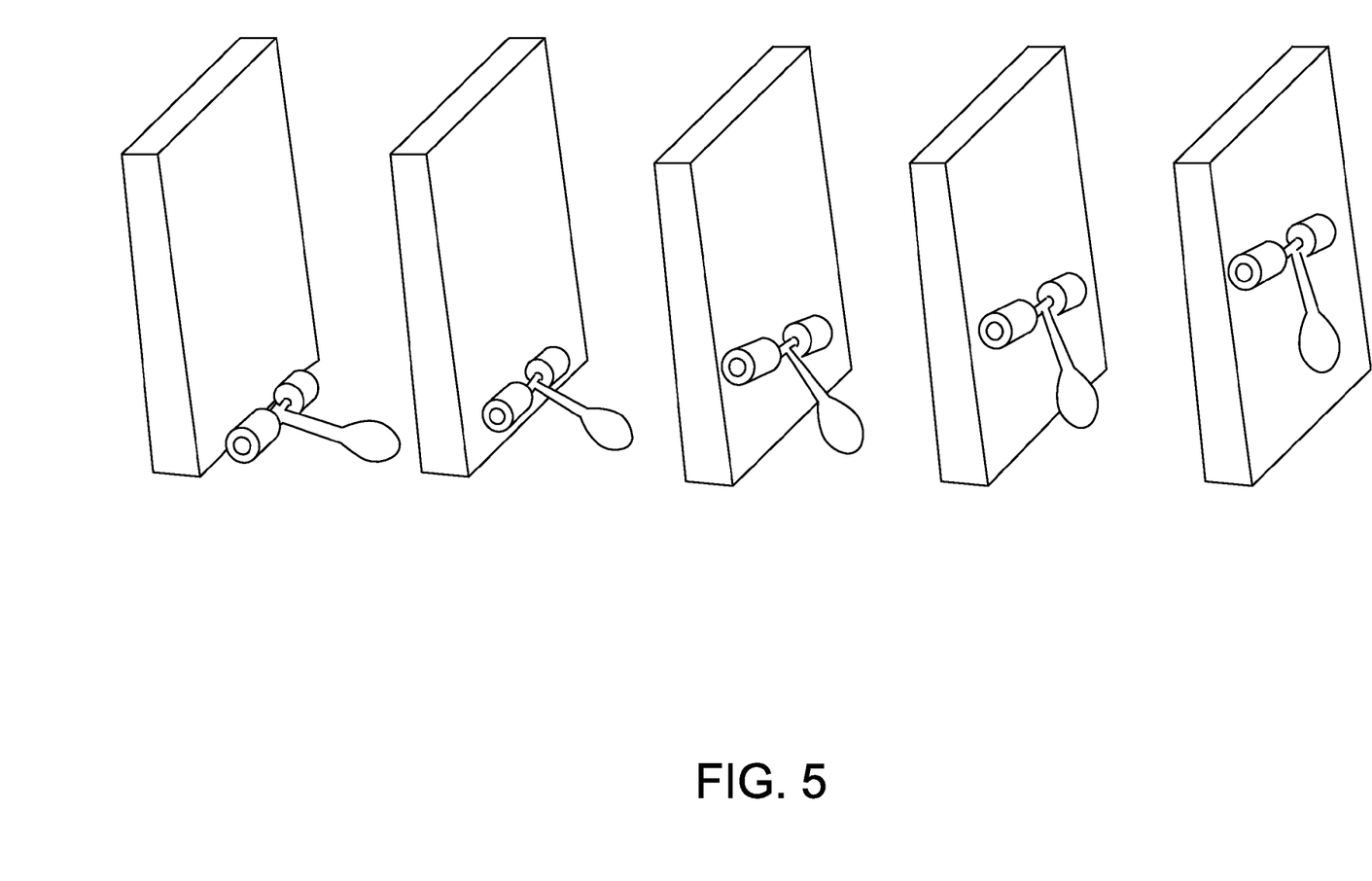
FIG. 5 shows a series of figures to illustrate a terrain traversing device traversing from a horizontal surface to a vertical surface in accordance with the present disclosure.

FIG. 5 shows a sequential series of figures to illustrate a terrain traversing device transitioning from traversing a horizontal surface to traversing a vertical surface in accordance with the present disclosure. Using a rotary implementation (wheel with microspines) instead of a linear implementation (as in prior art) provides for a symmetrical transition from one traversal plane to another traversal plane, more so when the two planes are angularly oriented with respect to each other. More particularly, the use of wheels equipped with microspines allows the terrain traversing device to transition smoothly and quickly from a horizontal surface to a vertical surface (and vice-versa). In contrast, a linear implementation would entail complex maneuvers that are not only disjointed, but also relatively ineffective, especially when attempting to transition from one traversal plane to an orthogonal traversal plane.

Furthermore, in contrast to prior art wheeled devices, the traversal from the horizontal surface to the vertical surface is not constrained by the diameter of the wheel assemblies In other words, diameter $d_1$ 245 (FIG. 2) may be determined independent of a height dimension of an irregularity in the traversal surface. For example, it is not necessary that the diameter of the wheel assembly be at least, say, 75% of the height of an obstacle to be surmounted. Consequently, in one embodiment, diameter $d_1$ 245 of the circular planar rotor is less than 75% of an object dimension such as for example, a curb height or a step height. However, in another embodiment, diameter $d_1$ 245 of the circular planar rotor is larger than an object dimension such as for example, a protrusion or a crevasse in a wall.

More particularly, in one example application, a terrain traversing device in accordance with the disclosure includes two 10 mm brushed DC motors that provide approximately 0.2 Nm of torque, which is adequate for the terrain traversing device to climb up a vertical surface while having an intrinsic weight of 300 grams and a payload of up to 100 grams. An ATmega328 microcontroller is used to control the rotation of the wheel assemblies based on remote commands, or on input from one or more sensors (not shown). A hybrid open-loop control architecture permits various throttle settings to provide for various torques such a first torque that is desirable for high speed traversal of a horizontal surface and a different torque that is desirable for better control when the terrain traversing device climbs up a vertical surface. A 7.4 V, 180 mAh LiPo battery pack provides approximately 20 minutes of mission life to the terrain traversing device. As can be understood, a higher capacity battery pack may be used instead, thereby incorporating higher weight and reduced speed, in order to obtain a longer mission life.

Furthermore, in this example application, the terrain traversing device can traverse a horizontal surface at a ground speed of about 45 cm/second and climb up a concrete surface having an incline of up to 90 degrees at a climbing speed of about 25 cm/second.

Figure 6:
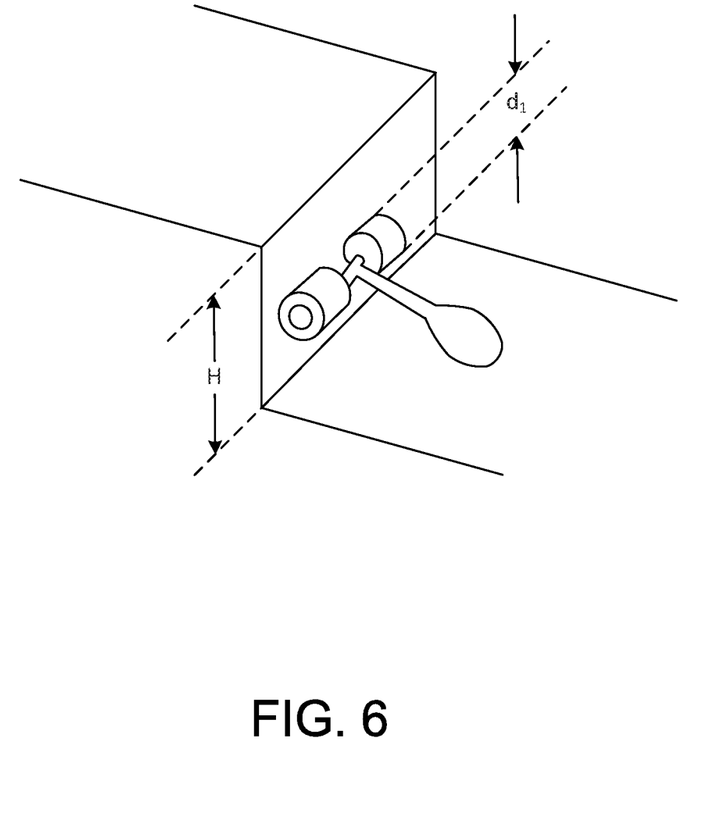
FIG. 6 indicates dimensional values associated with a terrain traversing device shown traversing a step in accordance with the present disclosure.

FIG. 6 indicates dimensional values associated with a terrain traversing device shown traversing a step in accordance with the present disclosure. Specifically, as shown, diameter $d_1$ of the microspine wheel assembly is less than the height "H" of the step. In one implementation, diameter $d_1$ of the microspine wheel assembly is about 240 mm.

As indicated in the description above, in contrast to prior art devices, traversal from the horizontal surface to the vertical surface is not constrained by the diameter of the wheel assembly. In other words, diameter $d_1$ may be determined independent of height "H" and it is not necessary that diameter $d_1$ be at least, say, 75% of height "H" as is the requirement in some prior art implementations. It will be understood however, that in various other implementations, diameter $d_1$ may turn out to be greater than the height of certain other objects in the traversal path. In contrast to prior art practice, such variances in the terrain surface do not have to be necessarily taken into consideration when selecting diameter $d_1$ 245.

Figure 7:
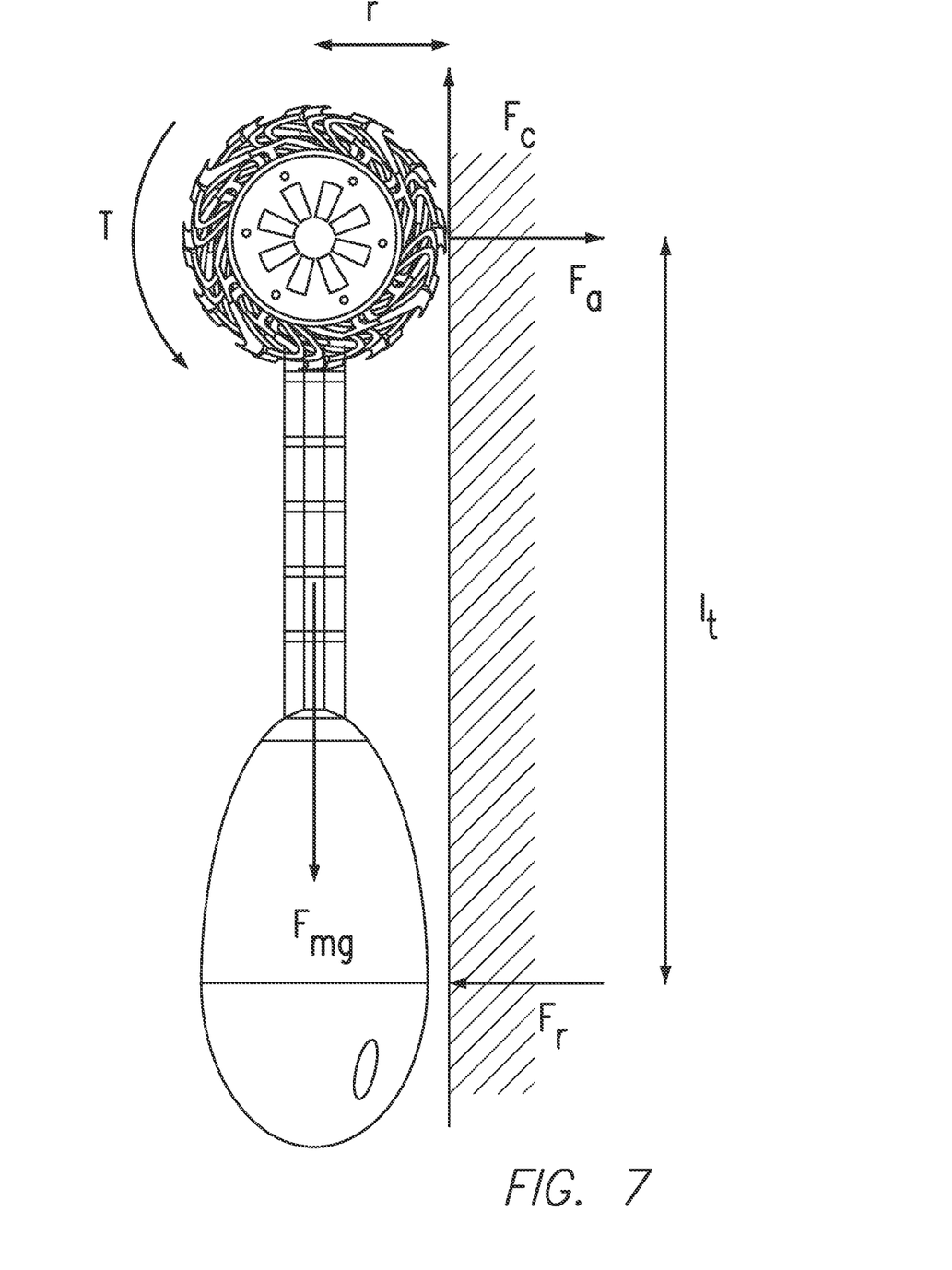
FIG. 7 shows a line drawing indicating various parameters associated with a terrain traversing device when traversing a vertical surface in accordance with the present disclosure.

Attention is now drawn to FIG. 7, which shows a line drawing indicating various parameters associated with a terrain traversing device when traversing a vertical surface in accordance with the present disclosure. The two-wheeled architecture described using FIGS. 1-6 is selected in part to provide a balance between adhesive forces created by the microspine hooks and the reactive force created by the weighted bulb at the end of the tail assembly. For the quasi-static condition indicated in FIG. 7, it is desirable that the adhesive force ($F_a$) be greater than the normal reaction at the tail ($F_r$) and pitch-back moment. This can be expressed as follows:

$$F_{a,maximum} \geq \frac{(Fmg*r) + T}{l_t}$$

Assuming that the radius (r) of the microspine wheel assembly is constant, the body length ($l_t$) may be selected so as to obtain a balance between horizontal and vertical traversal performance of the terrain traversal device. The selection of the body length is dependent on a number of factors including the mass of the terrain traversing device, surface conditions, and quality of engagement of the microspine hooks. It may be pertinent to point out that for good purchase may be obtained on certain types of surfaces that are not intrinsically smooth in nature. A few examples of such surfaces include wood, stone, stucco, and concrete surfaces that have irregularities in which the microspine hooks can obtain engagement.

In conclusion, using a rotary motion (rather than a linear dragging motion) for enabling engagement of microspine hooks on a surface (as described herein using a terrain traversal device) not only permits automatic transitioning from traversal of a horizontal surface to traversal of a near-vertical surface without manual intervention, but also permits terrain traversal at speeds higher than those obtainable via legged devices for example. The use of suitably light weight and durable materials for fabricating the terrain traversal device provides durability during impact as a result of a fall from a height, thereby eliminating the need for safety mechanisms or retrieval mechanisms. Furthermore, the terrain traversal device in accordance with the disclosure provides several advantages over prior art devices that are handicapped when traversing certain types of surfaces, such as rough or dusty surfaces (e.g., concrete, stone, etc.).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the terrain traversal device of the disclosure, and are not intended to limit the scope of what the inventors regard as their disclosure. Modifications of the above-described modes for carrying out the disclosure may be used by persons of skill in the robotic arts, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A terrain traversing device comprising:
a first microspine wheel assembly of a first driving wheel assembly, the first microspine wheel assembly comprising a circular planar rotor with a plurality of microspine hooks arranged on a circumferential edge of said circular planar rotor, each individual microspine hook mounted on an independently flexible suspension that accommodates a variable engagement angle between said individual microspine hook and an irregularity on a terrain surface when the circular planar rotor is rotated in one of a clockwise or a counter-clockwise direction to urge the terrain traversing device to traverse the terrain,
a first axle, wherein the first microspine wheel assembly is mounted on the first axle whereby the circular planar rotor of the first microspine wheel assembly is rotatable in one of a clockwise or a counter-clockwise direction to urge the terrain traversing device to traverse the terrain;
a second microspine wheel assembly of the first driving wheel assembly, the first and the second microspine wheel assemblies being mounted adjacent to each other on the first axle with the respective circular planar rotors parallel to each other; and a third and a fourth microspine wheel assembly of a second driving wheel assembly, the third and the fourth microspine wheel assemblies being mounted adjacent to each other on a second axle with the respective circular planar rotors parallel to each other.

2. The terrain traversing device of claim 1, wherein each of the plurality of microspine hooks in the first, second, third and fourth microspine wheel assemblies operate individually to provide a plurality of engagement angles that permit the terrain traversing device to transition from traversing a horizontal surface to traversing a vertical surface with no manual intervention.

3. The terrain traversing device of claim 2, wherein the vertical surface has a 90 degree slope with reference to the horizontal surface.

4. The terrain traversing device of claim 3, wherein the terrain traversing device is configured to traverse the vertical surface at a rate of about 25 cm/second.

5. A terrain traversing device comprising:
a first microspine wheel assembly comprising a circular planar rotor with a plurality of microspine hook assemblies arranged on a circumferential edge of said circular planar rotor, the plurality of microspine hook assemblies comprising a first microspine hook assembly having a first independently flexible suspension configuration supporting a first microspine hook, the first independently flexible suspension configured to permit the first microspine hook to initially engage an irregularity in a terrain surface with a parallel orientation between the terrain surface and the first microspine hook assembly and subsequently engage the irregularity with a continuously varying engagement angle between the first microspine hook and the terrain surface when said circular planar rotor is rotated in one of a clockwise or a counter-clockwise direction to urge the terrain traversing device to traverse a terrain surface,
wherein said first independently flexible suspension configuration comprises:
a flexible loop element attached to a proximal end of said first microspine hook assembly; and
a stretchable element attached to a distal end of said first microspine hook assembly.

6. The terrain traversing device of claim 5, wherein said first microspine hook has a hooked end arranged to point at a tangential angle to the circumference of said circular planar rotor.

7. A terrain traversing device comprising:
a first annular rotor element with a plurality of co-planar microspine hooks arranged on a periphery of said annular rotor element, each microspine hook having an independently flexible suspension configuration that permits each microspine hook to initially engage an irregularity in a terrain surface at a preset initial engagement angle and subsequently engage the irregularity with a continuously varying engagement angle when said annular rotor element is rotated for urging the terrain traversing device to traverse a terrain surface,
wherein said plurality of co-planar microspine hooks is part of a unitary mount that is attachable to said first annular rotor element in one of a) a flexibly removable arrangement or b) a rigidly mountable arrangement, and
wherein said unitary mount is formed in substantial part using polyurethane material, and wherein each of said plurality of coplanar microspine hooks comprises a metal.

8. A terrain traversing device comprising:
a first annular rotor element with a plurality of co-planar microspine hooks arranged on a periphery of said annular rotor element, each microspine hook having an independently flexible suspension configuration that permits each microspine hook to initially engage an irregularity in a terrain surface at a preset initial engagement angle and subsequently engage the irregularity with a continuously varying engagement angle when said annular rotor element is rotated for urging the terrain traversing device to traverse a terrain surface,
wherein said plurality of co-planar microspine hooks is part of a unitary mount that is attachable to said first annular rotor element in one of a) a flexibly removable arrangement or b) a rigidly mountable arrangement, and
wherein said unitary mount is formed in substantial part by using an elastomeric material, and wherein each of said plurality of co-planar microspine hooks comprises a metal.

9. A terrain traversing device comprising:
a first annular rotor element with a plurality of co-planar microspine hooks arranged on a periphery of said annular rotor element, each microspine hook having an independently flexible suspension configuration that permits each microspine hook to initially engage an irregularity in a terrain surface at a preset initial engagement angle and subsequently engage the irregularity with a continuously varying engagement angle when said annular rotor element is rotated for urging the terrain traversing device to traverse a terrain surface,
wherein said independently flexible suspension configuration comprises:
a flexible loop element attached to a proximal end of a respective microspine hook among the plurality of co-planar microspine hooks; and
a stretchable element attached to a distal end of said respective microspine hook.

10. The terrain traversing device of claim 9, wherein said preset initial engagement angle corresponds to a parallel orientation between the terrain surface and a hook assembly that houses an individual microspine hook.

11. The terrain traversing device of claim 10, wherein said continuously varying engagement angle comprises a first contributory angle between each individual microspine hook and the terrain surface, and a second contributory angle between said flexible loop element and the terrain surface.

12. The terrain traversing device of claim 11, wherein said first contributory angle is desirably continuously variable from about 0 degrees to about 30 degrees, and said second contributory angle is desirably continuously variable from about 0 degrees to about 15 degrees thereby providing a maximum limit of about 45 degrees to said continuously varying engagement angle.

13. A terrain traversing device comprising:
a cylindrical housing;
a first motor housed in the cylindrical housing and coupled to a proximal end of a first axle;
a first annular rotor element coupled to a distal end of said first axle, said first annular rotor element having a first set of co-planar microspine hooks arranged on a periphery of said first annular rotor element, each microspine hook arranged to engage upon contact with irregularities in a terrain surface when said first axle is rotated for urging the terrain traversing device to traverse the terrain surface;

a second motor housed in the cylindrical housing and coupled to a proximal end of a second axle;

a second annular rotor element coupled to a distal end of said second axle, said second annular rotor element having a second set of co-planar microspine hooks arranged on the periphery of said second annular rotor element, each microspine hook arranged to engage upon contact with irregularities in the terrain surface when said second axle is rotated for urging the terrain traversing device to traverse a terrain surface;

a first array of rotor elements comprising at least one additional annular rotor element that is substantially similar to the first annular rotor element, the at least one additional annular rotor element mounted adjacent to the first annular rotor element; and a second array of rotor elements comprising at least one another additional annular rotor element that is substantially similar to the second annular rotor element, the at least one another additional annular rotor element mounted adjacent to the second annular rotor element.

14. A rotary microspine device comprising:

a circular planar rotor with a plurality of microspine hooks arranged on a circumferential edge of said circular planar rotor, each individual microspine hook mounted on an independently flexible suspension that accommodates a variable engagement angle between said individual microspine hook and an irregularity on a traversal surface when the circular planar rotor is rotated, wherein the independently flexible suspension comprises:

a flexible loop element attached to a proximal end of a respective microspine hook among a plurality of co-planar microspine hooks; and a stretchable element attached to a distal end of said respective microspine hook.

15. The rotary microspine of claim 14, wherein the flexible loop element is configured as a c-shaped flexible joint.

16. The rotary microspine of claim 15, wherein the c-shaped flexible joint comprises an elastomer.

17. The rotary microspine of claim 14, wherein the flexible loop element comprises a spring.

* * * * *